No. 874,399. PATENTED DEC. 24, 1907.
W. GATERMAN.
BUNCHING DEVICE FOR WINDROWING ATTACHMENTS.
APPLICATION FILED NOV. 23, 1906.

WITNESSES:
O. R. Erwin
R. R. Maffioli

INVENTOR:
William Gaterman
By
Erwin & Wheeler
ATTORNEYS.

UNITED STATES PATENT OFFICE.

WILLIAM GATERMAN, OF MANITOWOC, WISCONSIN.

BUNCHING DEVICE FOR WINDROWING ATTACHMENTS.

No. 874,399.      Specification of Letters Patent.      Patented Dec. 24, 1907.

Application filed November 23, 1906. Serial No. 344,669.

*To all whom it may concern:*

Be it known that I, WILLIAM GATERMAN, a citizen of the United States, residing at Manitowoc, county of Manitowoc, and State of Wisconsin, have invented new and useful Improvements in Bunching Devices for Windrowing Attachments, of which the following is a specification.

My invention relates to improvements in bunching devices for windrowing attachments.

The primary object of my invention is to provide means for not only retaining the material upon the windrowing bars for a sufficient time to permit the material to accumulate, but also for promptly removing the material whereby all the material collected is simultaneously delivered.

A further object of my invention is to simplify the construction, and provide a structure which can be easily adjusted and manipulated without getting out of order.

Figure 1:
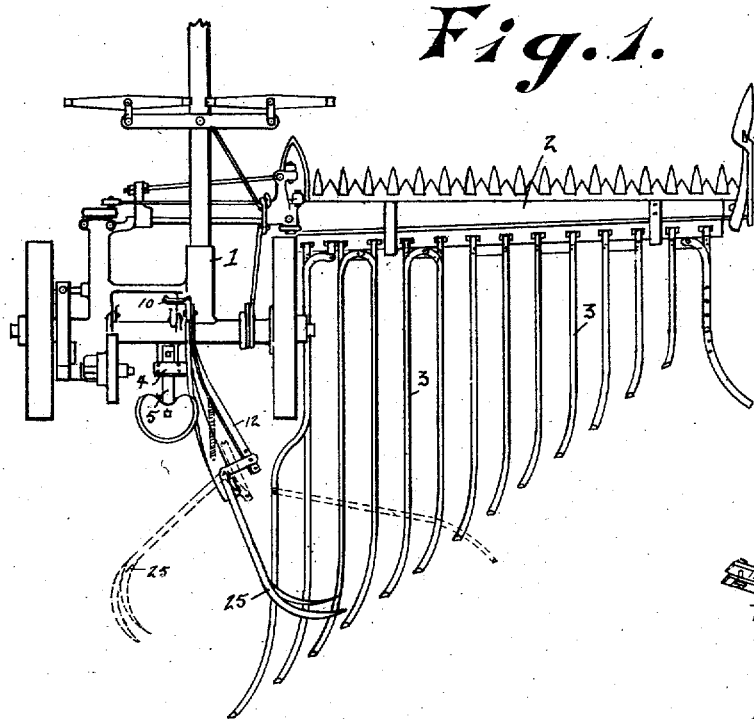
Figure 2:
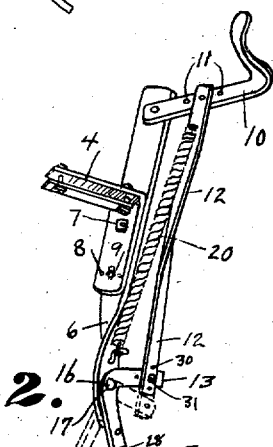
Figure 3:
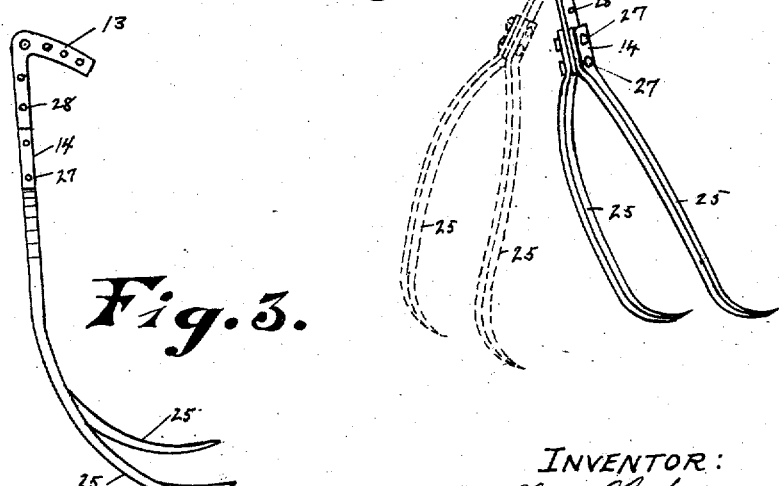

In the following description reference is had to the accompanying drawings in which, Figure 1 is a general plan view showing my invention in position of use. Fig. 2 is a perspective view of the bunching attachment, with dotted lines indicating the retracted position. Fig. 3 is a top view of the buncher fork detached.

Like parts are identified by the same reference characters throughout the several views.

1 is a mowing machine frame having a sickle bar 2 and windrowing bars 3 of any ordinary construction. A bracket 4 is secured to the seat post 5 and a supporting bar 6 is pivotally secured to the bracket at 7, and provided with a series of holes 8 by means of which it may be adjustably connected with the bar by a pin 9. The front end of the bar 6 is provided with a foot lever 10 pivotally secured to the bar, and also pivotally connected with a link 12 which extends rearwardly and is similarly connected with the elbowed arm 13 of a fork shank 14 the latter being connected with the rear end portion of the bar 6 by a pivot pin 16 inserted through a hole 17 in the shank elbow. A spring 20 connects the front end portion of link 12 with the rear end portion of bar 6 and by pulling backwardly on the link, tends to retract the fork to the position shown in dotted lines in Fig. 2. The link 12 is also adjustably connected with the foot lever 10, which is provided with pivot pin holes 11 for that purpose, as shown. By depressing the foot lever 10 the fork is swung inwardly to bunching position against the tension of the spring.

It will be observed that the fork arms 25 are curved and when in bunching position the free ends extend inwardly over the inner or longer windrowing bars and in front of the upwardly curved ends of such bars and the lower fork arm has a greater degree of curvature than the upper. It is also preferably a little shorter. The material on the windrowing bars moves inwardly along the bars and lodges against these curved arms of the buncher fork and upon and between these arms, so that when the foot lever is released, and the reaction of the spring 20 moves the fork arms outwardly, the entire bunch of material is withdrawn positively and deposited upon the ground in the rear of the machine carriage. The fork arms are connected with the shank by bolts 27, and additional bolt holes 28 are formed in the shank whereby the fork arms may be adjusted with reference to the windrowing bars in accordance with the requirements of the material. The bar 6 is preferably a flat bar having its side face secured to the seat bracket, and its rear end portion twisted to present a horizontal flat surface for the connection of the fork shank. The link 12 is provided with a series of holes 30 for the reception of the pivot pin 31 which connects it with the fork shank, whereby the fork may be adjusted to swing in a field of movements extending over the windrowing bars to a greater or less degree or wholly at the side thereof if desired.

In operation, the windrowing bars direct the material laterally from the rear of the sickle sections and a bunch of such material is collected in the angle formed by the windrowing bars with the fork. Since the fork extends over several of the longer windrowing bars, the raking effect of the stubble on the collected bunch tends to push the material between the arms of the fork and the same becomes lodged between such arms in such a manner as to cling thereto to a sufficient extent to permit the fork to draw the bunch off positively when the fork is swung to a position indicated in dotted lines. The position of the fork in front of the upturned ends of the longer windrowing bars prevents the material from being clogged or tangled in such bars, so that it only requires a slight engagement of the fork with the bunch of material to permit a positive withdrawal of the latter, especially in connection with the backward rake which is being constantly exercised by the stubble.

Having thus described my invention what I claim as new and desire to secure by Letters Patent is,

1. In a bunching device for windrowing attachments, the combination with a set of windrowing bars having upturned rear ends, of a laterally swinging fork provided with outwardly curved arms adapted, in one position of adjustment, to extend over the inner windrowing bars in front of their rear end portions, means for holding the fork temporarily in such position, and means for swinging it laterally to positively withdraw the collected material from the windrowing bars.

2. In a bunching device for windrowing attachments, the combination with a set of windrowing bars having upturned rear ends, of a laterally swinging fork provided with outwardly curved arms adapted, in one position of adjustment, to extend over the inner windrowing bars in front of their rear end portions, means for holding the fork temporarily in such position, and means for swinging it laterally to positively withdraw the collected material from the windrowing bars; the lower arm of said fork having a greater degree of curvature than the upper arm.

3. In a bunching device for windrowing attachments, the combination with a set of windrowing bars having upturned rear ends, of a laterally swinging fork provided with outwardly curved arms adapted, in one position of adjustment, to extend over the inner windrowing bars in front of their rear end portions, means for holding the fork temporarily in such position, and means for swinging it laterally to positively withdraw the collected material from the windrowing bars; said fork having an elbowed shank a pivotal support therefor, an actuating lever linked to the shank, and a retracting spring connecting the link with the support, and arranged to normally pull upon the link in a direction to swing the fork outwardly.

4. The combination with a mowing or reaping machine having a wind-rowing attachment, of a supporting bar, a fork having its shank connected with the bar by a substantially vertical pivot pin and having forked arms extending rearwardly in substantially horizontal planes, a foot lever pivoted to the bar, a link connecting the foot lever with the fork shank, and a spring arranged to normally swing the fork laterally away from the wind rowing bars substantially in a horizontal plane,—said foot lever being arranged to act in opposition to the pull of the spring.

5. The combination with a mowing or reaping machine, having a wind-rowing attachment comprising a set of trailing bars with upwardly curved rear ends, of a fork supporting bar, a fork having its shank pivotally connected with the bar and arranged with the forked arms extending rearwardly and having extremities curved toward the wind-rowing bars and terminating at a point between the pivot and the upwardly curved portions of the longer wind-rowing bars, whereby the material moving laterally from the bars engages between the fork arms and over the free ends thereof, a foot lever connected with the fork and adapted to swing the same in one direction, and a spring adapted to swing the fork in the other direction, said fork being arranged to swing laterally toward and away from said wind rowing bars.

In testimony whereof I affix my signature in the presence of two witnesses.

WILLIAM GATERMAN.

Witnesses:
O. R. ERWIN,
LEVERETT C. WHEELER.